US012044048B1

(12) United States Patent
Wylie et al.

(10) Patent No.: US 12,044,048 B1
(45) Date of Patent: Jul. 23, 2024

(54) DOOR STOPPER MECHANISM INTEGRATED WITH A DOOR HINGE

(71) Applicants: Albert Wylie, Titusville, FL (US); Christine Wylie, Titusville, FL (US)

(72) Inventors: Albert Wylie, Titusville, FL (US); Christine Wylie, Titusville, FL (US)

( * ) Notice: Subject to any disclaimer, the term of this patent is extended or adjusted under 35 U.S.C. 154(b) by 9 days.

(21) Appl. No.: 18/103,984

(22) Filed: Jan. 31, 2023

Related U.S. Application Data

(60) Provisional application No. 63/305,895, filed on Feb. 2, 2022.

(51) Int. Cl.
*E05D 11/06* (2006.01)
*E05C 17/00* (2006.01)

(52) U.S. Cl.
CPC .................................. *E05C 17/025* (2013.01)

(58) Field of Classification Search
CPC ..... E05D 11/06; E05D 11/10; E05D 11/1007; E05D 11/1028; E05D 11/1014; E05D 11/0054; E05D 2011/10; E05D 2011/1028; E05D 2011/1092; E05Y 2201/218; E05Y 2201/224; E05Y 2900/132; E05F 5/06; E05C 17/00; E05C 17/025
See application file for complete search history.

(56) References Cited

U.S. PATENT DOCUMENTS 2,047,909 A * 7/1936 North ........................ E05D 3/02 16/250
2,586,757 A * 2/1952 Wummel ................ E05D 11/06 16/377
3,602,942 A 9/1971 Neff et al.
3,913,171 A 10/1975 Reid
3,971,099 A * 7/1976 Wallace .................. E05D 11/06 16/50
4,259,762 A 4/1981 Civitelli
4,648,152 A 3/1987 Grewall
5,287,596 A 2/1994 Chen et al.
5,560,080 A * 10/1996 Reed ................... E05D 11/0018 16/374
5,661,875 A * 9/1997 Overcash ................ E05D 11/06 16/377

(Continued)

FOREIGN PATENT DOCUMENTS

DE 202009014676 U1 * 3/2010 ........... E05C 17/025
KR 2013028521 A * 3/2013

(Continued)

*Primary Examiner* — Chuck Y Mah

(74) *Attorney, Agent, or Firm* — John Rizvi; John Rizvi, P.A.—The Patent Professor®

(57) ABSTRACT

A door stopper device mounts to the pivot joint of a door hinge and provides a mechanical travel stop to adjustably limit the rotational range of the door. The device includes an elongate, curved hinge-mounting body having a split sleeve construction defining a space configured to receive the pivot joint of the door hinge. A circular end structure is disposed at each axial end of the sleeve body. An axially-extending and screw-receiving threaded passageway is formed in each end structure. During installation, after the sleeve body is mounted to the pivot hinge of the door, a set screw is threaded through each end structure passageway to form a respective press fit connection with one end of the hinge pin to secure the device to the pivot joint.

20 Claims, 6 Drawing Sheets

(56) References Cited

U.S. PATENT DOCUMENTS

| | | | | |
|---|---|---|---|---|
| 5,727,289 | A | 3/1998 | Reder | |
| 5,881,431 | A * | 3/1999 | Pieper, II | E05D 11/06 16/374 |
| 5,966,778 | A * | 10/1999 | Ray | E05D 11/082 16/338 |
| 6,574,836 | B1 * | 6/2003 | Steeber | E05D 11/082 16/337 |
| 7,197,791 | B1 | 4/2007 | Smith | |
| 7,559,114 | B2 | 7/2009 | Ranilovich | |
| 9,416,572 | B2 | 8/2016 | Tolliver | |
| 9,765,556 | B2 * | 9/2017 | Stots | E05D 11/1007 |
| 9,988,833 | B2 * | 6/2018 | Powell | E05F 5/02 |
| 10,415,281 | B2 * | 9/2019 | Enos | E05C 19/184 |
| 11,021,899 | B1 * | 6/2021 | Tirado | E05D 11/1007 |
| 2002/0129464 | A1 * | 9/2002 | Davis | E05D 11/0054 16/250 |
| 2011/0030168 | A1 * | 2/2011 | Schau | E05D 11/0054 16/82 |
| 2013/0104345 | A1 | 5/2013 | Granberry | |
| 2013/0219664 | A1 | 8/2013 | Burda | |
| 2016/0194909 | A1 * | 7/2016 | Karcher | E05D 3/02 16/374 |
| 2017/0084144 | A1 * | 3/2017 | Ricks | E05D 11/00 |
| 2021/0127832 | A1 * | 5/2021 | Shahzad | A47B 97/00 |
| 2023/0235607 | A1 * | 7/2023 | Agostino | E05C 17/045 |

FOREIGN PATENT DOCUMENTS

| | | | |
|---|---|---|---|
| KR | 20140105904 | A * | 9/2014 |
| RU | 2560334 | C2 | 1/2014 |

* cited by examiner

DOOR STOPPER MECHANISM INTEGRATED WITH A DOOR HINGE

CROSS-REFERENCE TO RELATED APPLICATIONS

This application claims the benefit of U.S. Provisional Patent Application Ser. No. 63/305,895, filed on Feb. 2, 2022, which is incorporated herein in its entirety.

FIELD OF THE INVENTION

The present invention relates generally to door stoppers, and more particularly, to a removable door stopper device configured to adjustably control the pivot range of a door using a mechanism integrated with one of the door hinges.

BACKGROUND OF THE INVENTION

All property owners are familiar with how expensive repairs for articles inside the property can be. For instance, repairing an air conditioning unit can cost a property owner a few thousand dollars to replace the outside unit. If the owner has to replace the air handler and the outside unit, the cost to replace the unit increases by a few hundred dollars. Similarly, the costs associated with plumbing or electrical work can range from a few hundred dollars to a few thousand dollars. Some of these necessary repairs, however, are unavoidable and necessary over time due to normal usage of the equipment or article.

A common repair that occurs and is avoidable, but is sometimes not particularly focused on because its costs do not rival the costs to repair an airconditioning unit or plumbing or electrical work, is the cost to repair doors. Door repairs generally cost a few hundred dollars in the most expensive cases and one or two hundred when dealing with a door made out of cheap material. However, damaged doors made out of specialized or rare materials, such as highly-priced woods, metal, or glass, may cost thousands of dollars to repair or replace. It is highly desirable to protect highly-priced doors. Doors, irrespective of their material, however, are oftentimes damaged when being opened or closed because they strike an adjacent surface, such as a wall or an article in close proximity, e.g., a furniture piece.

To avoid and overcome unwanted damage to swinging doors, existing products such as door arm closers or door stoppers are available to control the movement and pivot angle of the door. These products, however, are eye soars and detract from the beauty and craftsmanship of the door construction. Some products are also costly and difficult to install, requiring a skilled laborer to work on its installation by affecting the surrounding areas proximate the door. For example, the installation of a door closer or door stopper requires the installer to make holes in the door or wall surface to install either product to function.

Accordingly, there is an established need for a door stopper mechanism configured to integrate with the door hinge without disassembly or alteration of the existing door hinge, and which facilitates adjustable control of the maximum available pivot angle of the door to prevent damage to the door or control the pivoting angle of the door.

SUMMARY OF THE INVENTION

The present invention is directed to a door stopper device configured to mount and attach to the hinge assembly of a door. The device includes a hinge-mounting structure in the form of a curved, elongate body having the form of a split sleeve construction. The split sleeve configuration defines a receptacle space configured to receive the pivot joint of a door hinge assembly. The sleeve-shaped body terminates with a pair of circular-shaped end structures disposed at respective axial ends of the body. A threaded, axially-extending through-hole or passageway is formed in each end structure and configured to receive a respective set screw. A carrier structure is formed at the convex-shaped, exterior side of the sleeve body. The carrier structure includes a threaded through-hole or passageway configured to receive a hinge-contactable and door-arresting stop screw.

During installation, the sleeve body is mounted to the pivot joint of the hinge assembly. In a conventional door hinge, the pivot joint involves the cooperation of a pair of hinge leaves to interlock and form a knuckle having the form of a hollow, cylindrical shape. The knuckle receives a hinge pin to complete the assembly and secure the hinge joint. The mounting relationship between the sleeve body and the pivot joint of the hinge assembly involves seating of the knuckle and pin combination within the receptacle space defined by the sleeve body. In this position, the end structures are located at respective ends of the installed hinge pin. A set screw is advanced into the threaded passageway of each respective end structure until it engages and forms a press fit connection with a respective end of the hinge pin. The press fit action of both set screws has the effect of clamping the door stopper device to the pivot joint of the door hinge. A stop screw is advanced through the threaded passageway of the carrier until it projects from the egress end of the passageway. The degree of projection of the stop screw functions as a means to control the range of rotation of the door. The combination of carrier structure and screw-receiving passageway formed in the carrier structure is configured so that the projecting part of the stop screw is aligned with the travel path of the exposed portion of the door-mounted, swing-side hinge leaf. In the event the door is opened to an angular displacement reaching the door stopper device, the exposed portion of the door-mounted, swing-side hinge leaf will encounter and strike the projecting part of the stop screw, halting any further rotation of the door.

Introducing a first embodiment of the invention, the present invention consists of a door stopper device for use in combination with a door hinge having a pivot joint, comprising:

- an elongate, curved hinge-mounting body having a split sleeve construction defining a hinge-receiving space configured to receive the pivot joint of the door hinge;
- a pair of generally circular end structures each disposed at respective axial ends of the hinge-mounting body, each end structure including an axially-extending threaded aperture formed therethrough;
- a pair of set screws each operably translatable through the corresponding aperture of a respective end structure to define a respective press fit connection with the pivot joint of the door hinge;
- a carrier disposed at an exterior surface of the hinge-mounting body;
- wherein the carrier includes a threaded aperture formed therethrough having a longitudinal dimension generally transverse to the axial dimension of the hinge-mounting body; and
- a stop screw operably translatable through the aperture formed in the carrier.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a door stopper or door brake mechanism that removably attaches to one of the door hinges. The mechanism functions as a mechanical limiter for door travel, providing an adjustable feature that enables the user to selectively control the rotational or swing range of the door. The mechanism is installed on one of the door hinges in a retrofit arrangement that does not require disassembly, modification, or alteration to the existing door hinge. Additionally, the mechanism employs a mechanical stop feature which, at the set limit of door rotation, engages the movable, swing-side hinge leaf, avoiding the possibility of any damaging contact with the wall, trim or door structures.

Figure 1:
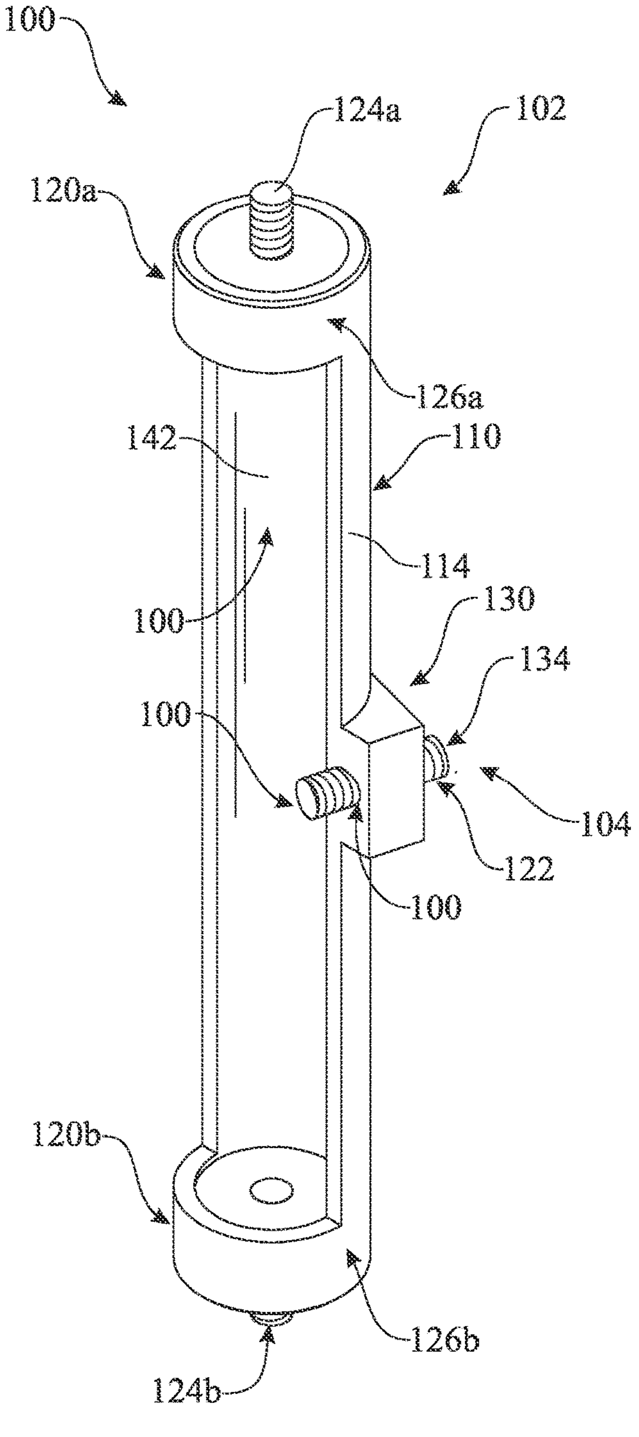
FIG. 1 presents a perspective, front-side assembled view showing a first embodiment of the door stopper device of the present invention, illustrating the hinge-receiving receptacle space of the device.
Figure 2:
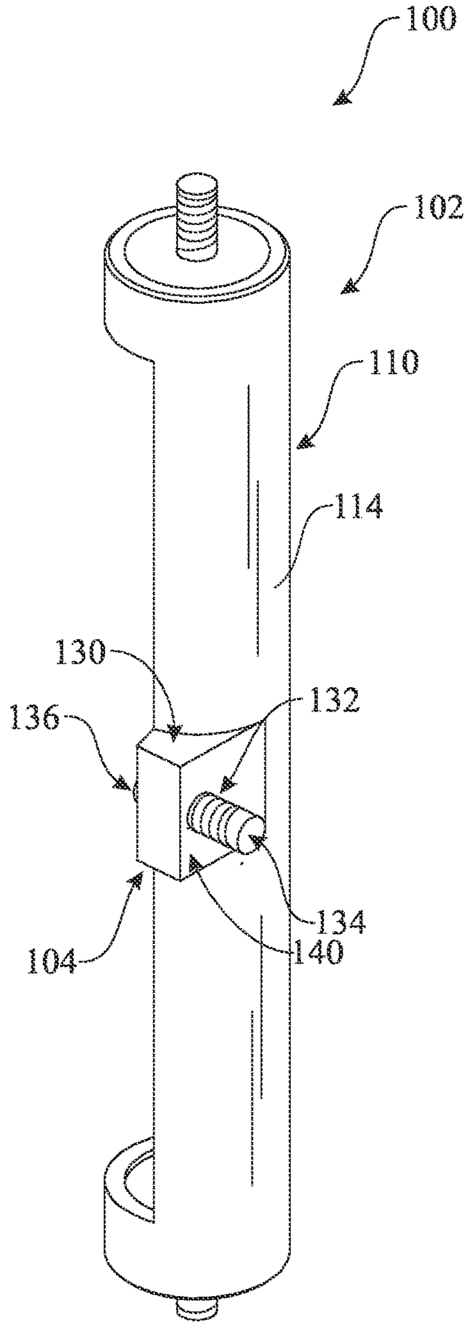
FIG. 2 presents a perspective, rear-side assembled view of the first embodiment of the door stopper device of the present invention.
Figure 3:
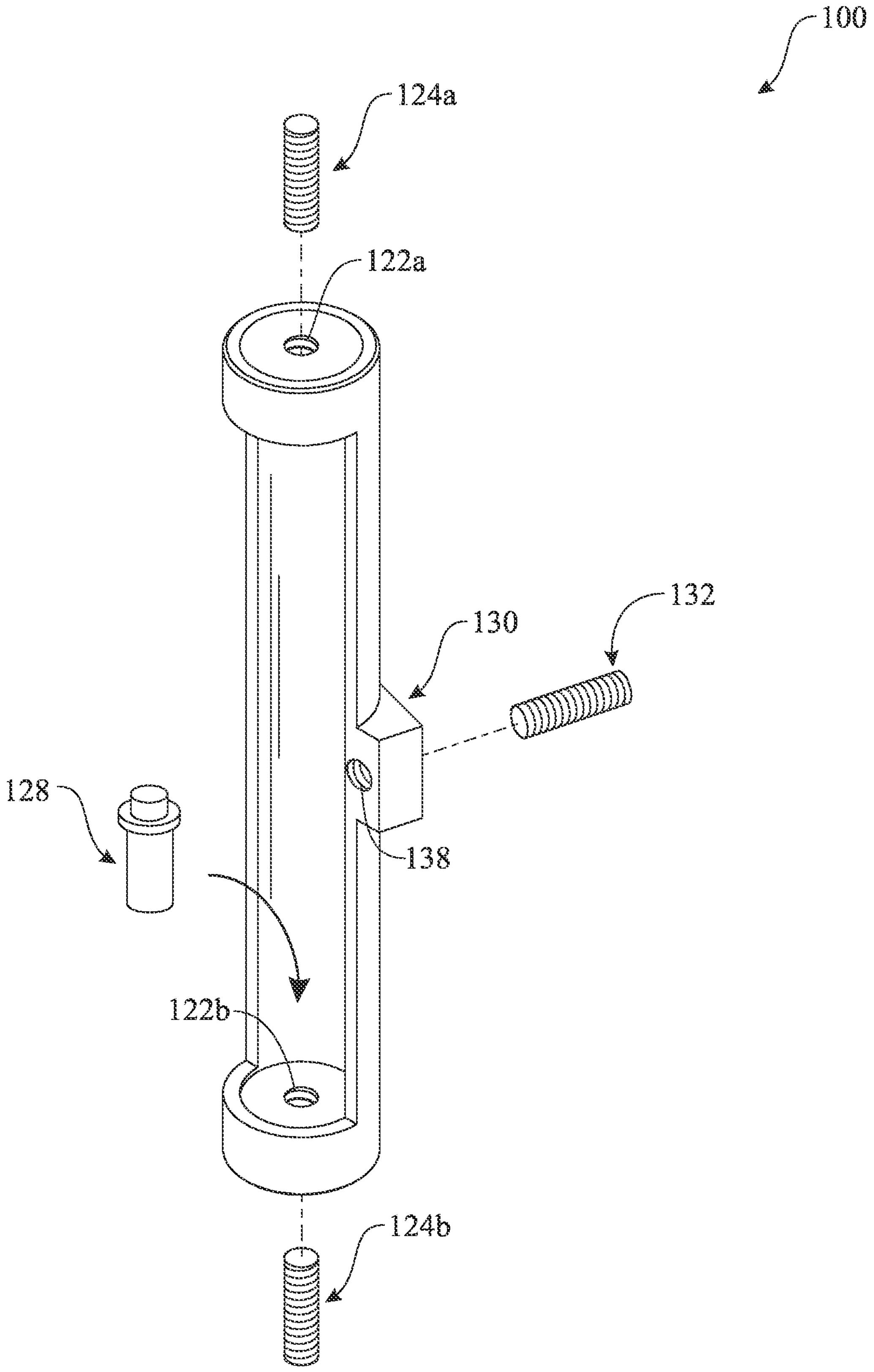
FIG. 3 presents a perspective, exploded view of the first embodiment of the door stopper device of the present invention, illustrating the pair of set screw fasteners used to secure the device to the door hinge and the adjustment screw used to control the pivot range of the door.

Referring initially to FIGS. 1-3, a door stopper device or mechanism 100 is disclosed according to a first embodiment of the present invention. The mechanism 100 is installed on a conventional door hinge assembly 200 (FIG. 4) and functions as a contact-type mechanical travel stop to adjustably limit the rotational range of the door. The mechanism 100 includes, in combination, a hinge-mounting structure generally illustrated at 102 and a door-stopping structure carried by the hinge-mounting structure 102 and generally illustrated at 104. As disclosed further herein, the hinge-mounting structure 102 is configured to releasably mount or attach to the hinge joint of a door hinge assembly. The door-stopping structure 104 is configured to provide an adjustable feature that allows the user to select the range or limit that a door can be opened. In particular, the door-stopping structure 104 provides a setting or control feature that defines or specifies the range of motion of the door. This limit on the rotational, pivoting, or swinging action of the door functions as a mechanical impediment, obstruction or restriction to increased rotation of the door.

Briefly, by way of overview, a typical or conventional hinge assembly includes a pair of opposing wings or leafs that form complementary interlocking halves, one a stationary frame-side leaf and the other a swing-side leaf movable with the door. The frame-side leaf is stationary and fixedly attached to the door frame. The swing-side leaf is movable in view of its fixed attachment to the inside edge (side) of the door proximal its turning or pivot axis. Each leaf includes a rectangular-shaped mounting plate and a set of spaced-apart, cylindrical-shaped, pin-receiving projections at one edge of the plate. The leafs are designed as complementary pieces so that when the leafs are joined together, the projections interlock in alternating fashion to form a knuckle, a hollow cylindrical-shaped tube or space that defines the pivot axis of the hinge joint. A removable pin is inserted through the knuckle to complete assembly of the hinge. The door is typically equipped with a set of three spaced-apart hinges. The arrangement of the knuckle-pin combination forms the hinge or pivot joint of the hinge assembly. According to the present invention, the mechanism 100 is mounted to the pivot joint (knuckle-pin combination) of any one of the hinge assemblies associated with the door.

Referring again to FIGS. 1-3, the hinge-mounting structure 102 of device 100 includes, in combination, an elongate, curved, sleeve-like body 110 and an integral pair of end structures 120*a,b* disposed at respective axial ends of sleeve body 110. The sleeve-shaped body 110, in particular, terminates with a pair of circular-shaped end structures 120*a,b* disposed at respective axial ends of body 110. Preferably, the sleeve body 110 and the pair of end structures 120*a,b* form a unitary integral construction. The sleeve body 110 has a curved profile and defines a partial, cylindrically-shaped structure. In one form, the sleeve body 110 can be configured as a split sleeve or semi-tubular construction. The sleeve body 110 includes an interior or inner-facing concave side 112 and an exterior or outer-facing convex side 114. The sleeve body 110 defines an open, axially-extending, hinge-receiving receptacle space generally illustrated at 116, which axially extends between the pair of end structures 120*a,b*. The receptacle space 116 is bounded on one side by the sleeve body 110. The sleeve body 110 is sufficiently sized, shaped and dimensioned to suitably receive and otherwise contain the pivot joint (knuckle-pin combination) of a door hinge. For this purpose, sleeve body 110 features a curvature that conforms to and is otherwise compatible with the cylindrical shape of the integral knuckle-pin combination of the hinge so that this combination can adequately seat or fit within the receptacle space 116 of sleeve body 110.

The pair of end structures 120*a,b* each includes a generally cylindrical body 126*a,b* generally oriented in a plane orthogonal to the axis of sleeve body 110. Each end structure 120*a,b* includes a threaded, screw-receiving aperture, hole or passageway 122*a,b* (FIG. 3) extending completely through the respective body 126*a,b* from an axially outer side to an axially inner side thereof (i.e., direction of threading). In particular, a threaded, axially-extending through-hole or passageway 122*a,b* is formed in each end structure 120*a,b*. Each screw-receiving aperture 122*a,b* defines a threading axis generally parallel to the longitudinal dimension of sleeve body 110. Each screw-receiving aperture 122*a,b* is configured to threadedly receive a respective fastener or set screw 124*a,b*. Briefly, during installation, mechanism 100 is mounted to the pivot joint (integral pin-knuckle combination) of the door hinge. In this mounting configuration, the integral pin-knuckle combination is received within the receptacle space 116 of the curved sleeve body 110 of mechanism 100. In this hinge-receiving position, the mechanism 100 is oriented so that the end structures 120*a,b* are located axially adjacent and outside respective ends of the hinge pin located in the hinge knuckle. For example, in the installation-ready upright orientation of FIGS. 1 and 2, end structure 120*a* serves as an upper component lying above the head of the knuckle-installed hinge pin, while end structure 120*b* serves as a lower component lying below the tip of the installed hinge pin. The end structures 120*a,b* are configured so that their respective screw-receiving apertures 122*a,b* axially align with the longitudinal dimension of the pin during installation. In this manner, the set screws 124*a,b* can access the hinge pin to perform a securing function. In particular, the set screws 124*a,b* are independently threaded and advanced through their respective apertures 122*a,b* formed in end structures 120*a,b* until the projecting tip of the set screw makes contact with the hinge pin at the head and tip, respectively.

In one exemplary alternative embodiment, the door stopper device 100 may include a pin 128 that is positioned within a screw-receiving aperture 122*a,b*. As specifically shown in exemplary embodiment FIG. 3, the pin 128 may be disposed axially aligned with the screw-receiving aperture 122*b* formed in end structure 120*b*. The pin 128 is designed or otherwise configured to engage set screw 124*b*. In this configurational use of pin 128, the door stopper device can provide much better anti-rotational properties. Whether a pin 128 is utilized, it should be understood that the set screws 124*a,b* are sufficiently threaded further to establish a press fit against the hinge pin at both ends, which functions to firmly but releasably secure the mechanism 100 to the door hinge assembly via a press fit connection with the hinge pin. The set screws 124*a,b* may have any type of conventional drive well known to those skilled in the art, including, but not limited to, cross (Phillips), hex (Allen), star (Torx), or square (Robertson). The end structures 120*a,b* have the form of an end cap or cover.

The combination of sleeve body 110 and the pair of end structures 120*a,b* effectively functions and/or acts as a clamping device to fasten, hold, attach and otherwise secure mechanism 100 to the door hinge assembly. In such a clamp configuration, the end structures 120*a,b* effectively function as jaw members to capture, enclose and hold tight against the hinge joint via the press fit connection between the driven set screws 124*a,b* and the installed hinge pin. The clamping action tends to fix the mechanism 100 in place during operation, so that as the door pivots, swivels or rotates, the mechanism 100 remains stationary in its secured location on the hinge joint. The clamping condition is releasable by appropriate removal of the press fit connection between the hinge pin and the pair of set screws 124*a,b*, which occurs by suitable withdrawal (reversal) of the set screws 124*a,b* from their apertures 122*a,b*. As disclosed, the mechanism 100 does not require any manipulation of the existing door hinge assembly, either by way of disassembly or part replacement. The mechanism 100 is simply mounted to the door hinge assembly as-is in its normal installed working arrangement.

Referring still to FIGS. 1-3, the door-stopping structure 104 of mechanism 100 includes a carrier structure generally illustrated at 130 and further includes a hinge-contactable and door-arresting stop screw 132 carried by carrier 130 and selectively threadable through a screw-receiving aperture, hole or passageway 138 formed in carrier 130. As discussed further, the stop screw 132 functions as a contact-type mechanical travel stop configured to limit the range of motion of a door. Referring briefly to the design of a conventional hinge assembly, the swing-side hinge leaf mounted to the side of the door is typically configured so that a portion of the leaf plate extends from the inner edge of the door towards the door pivot axis. This extension of the swing-side leaf plate from the door edge forms an exposed portion of the swing-side leaf plate. According to the present invention, the door-stopping structure 104 is configured so that the portion of stop screw 132 projecting or extending out from the door-facing end of aperture 138 is aligned, at least in part, with the path of travel for the exposed portion of the swing-side leaf plate. This alignment relationship causes the swing-side leaf plate (at its exposed portion) to impinge or collide with the door-facing projection of stop screw 132 at a certain preset angular rotation of the door, thereby restricting further travel or opening of the door. The carrier structure 130 is preferably integrally formed with sleeve body 110, although it may be a discrete component attached to sleeve body 110.

Referring more particularly to FIGS. 1-3, the carrier structure 130 can take any form suitable to hold and position the adjustable stop screw 132 in a manner sufficient to allow the projecting part of stop screw 132 to encounter the hinge assembly (exposed portion of the swing-side leaf plate) at the rotational limit set by the stop screw 132. The carrier structure 130 is located on the exterior, convex side 114 of the elongate sleeve body 110. The screw-receiving aperture 138 formed in carrier structure 130 includes an ingress or frame-side end generally illustrated at 140 (FIG. 1) and an egress or door-side end generally illustrated at 142. During operation, the stop screw 132 is inserted into the threaded aperture 138 at ingress end 140, and, after advancing sufficiently, emerges from aperture 138 at egress end 142, creating a tip portion of stop screw 132 projecting from aperture 138. This projecting, tip portion of stop screw 132 functions as the structural element to contact or engage the hinge assembly (exposed portion of the swing-side leaf plate) at the relevant rotational displacement of the door. The aperture 138, in one form, preferably has an orientation that facilitates a generally orthogonal engagement between the inserted stop screw 132 and the exposed portion of the swing-side leaf plate during operation of mechanism 100. This engagement restricts or stops further rotational movement of the door. It is preferable, in one form, that stop screw 132 exhibit a generally horizontal orientation parallel to the floor when stop screw 132 is threaded through aperture 138.

The stop screw 132 has an adjustment end 134 and a working end 136. The adjustment end 134 of stop screw 132 is configured to enable the user to selectively translate the stop screw 132 through the screw-receiving aperture 138. This translation conventionally includes an advancement (threading) and withdrawal (unthreading) of stop screw 132 relative to the screw-receiving aperture 138. The adjustment end 134, for example, may be equipped with a hex-shaped indent to facilitate turning or driving with an Allen wrench. The working end 136 of stop screw 132 is configured as a leaf-striking and/or leaf-colliding section of stop screw 132, at which the stop-inducing impact takes place between stop screw 132 and the exposed portion of the swing-side leaf plate of the door hinge assembly. The working end 136 defines a door-facing, leading portion of stop screw 132, while the adjustment end 134 defines a frame-facing, trailing portion. During operation, the stop screw 132 is threaded into the screw-receiving aperture 138, which occurs by advancing the leading portion of stop screw 132 (working end 136) into aperture 138 via ingress end 140. The stop screw 132 is threaded further until the working end 136 clears aperture 138 at its egress end 142, and is advanced an additional amount commensurate or proportional to where the user desires to establish the stop point for swinging rotation of the door. The projection of stop screw 132 from the egress end 142 of aperture 138 defines the section of stop screw 132 that contacts the hinge assembly to create the door-stopping action. In particular, the terminal face of the working end 136 of stop screw 132 makes contact with the swing-side hinge plate during the door-stopping event.

Figure 4:
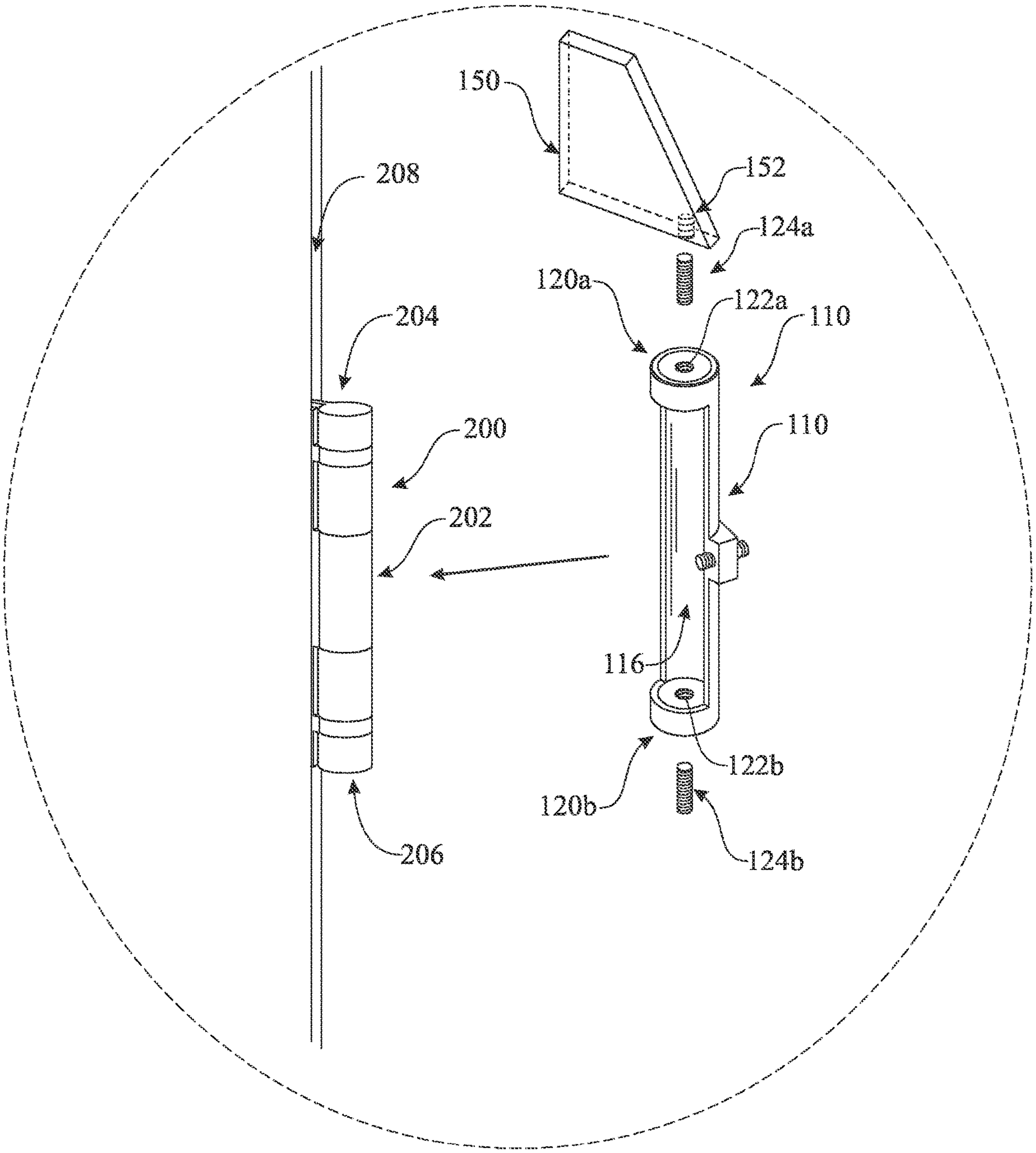
FIG. 4 presents a perspective view illustrating the installation process for attaching the door stopper device of the present invention to an exemplary door hinge.
Figure 5:
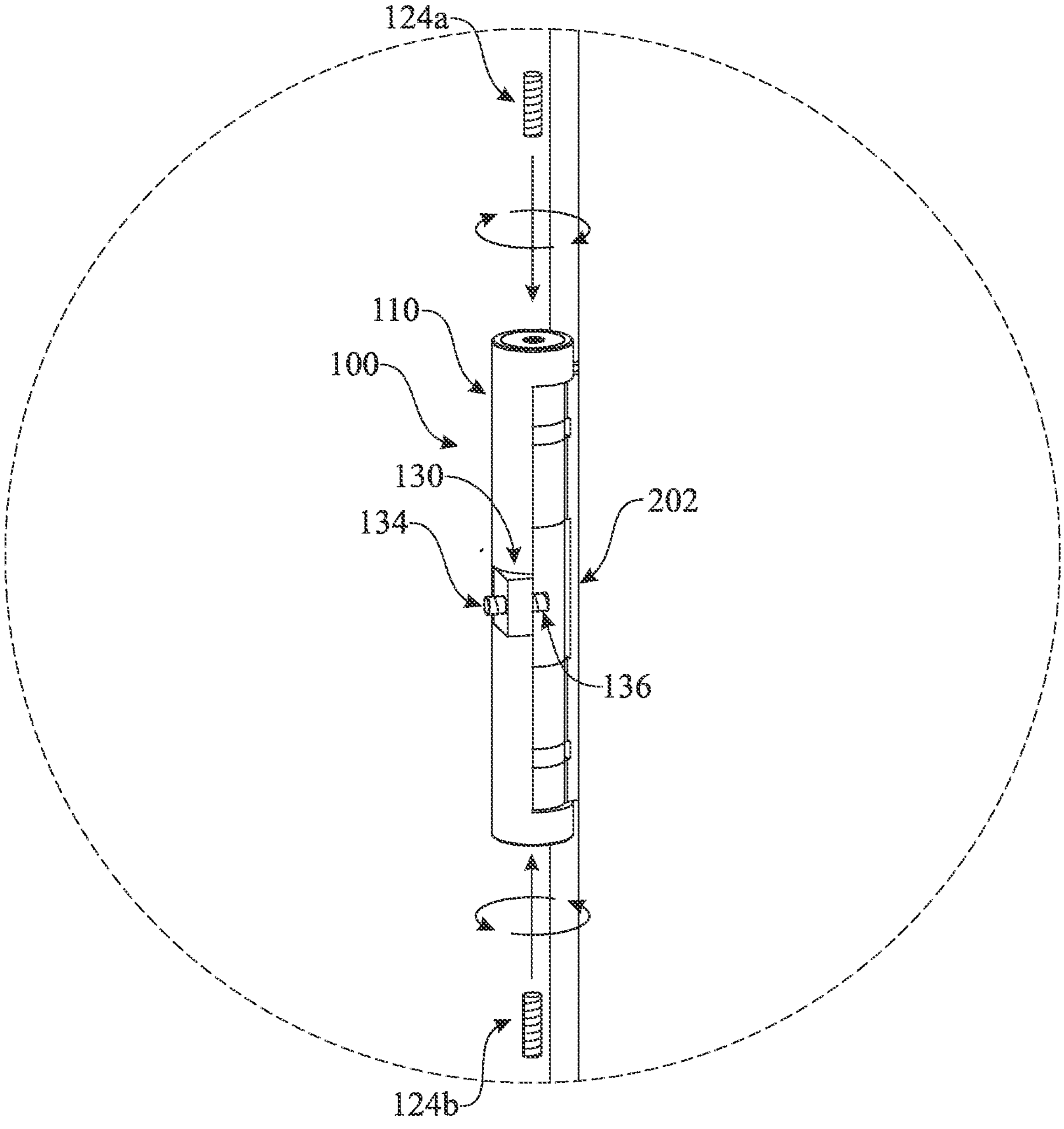
FIG. 5 presents a perspective view showing the door stopper device of the present invention partially installed on a door hinge, and further illustrating the process of maneuvering the pair of end fasteners into place to secure the door stopper device to the hinge to complete the installation.
Figure 6:
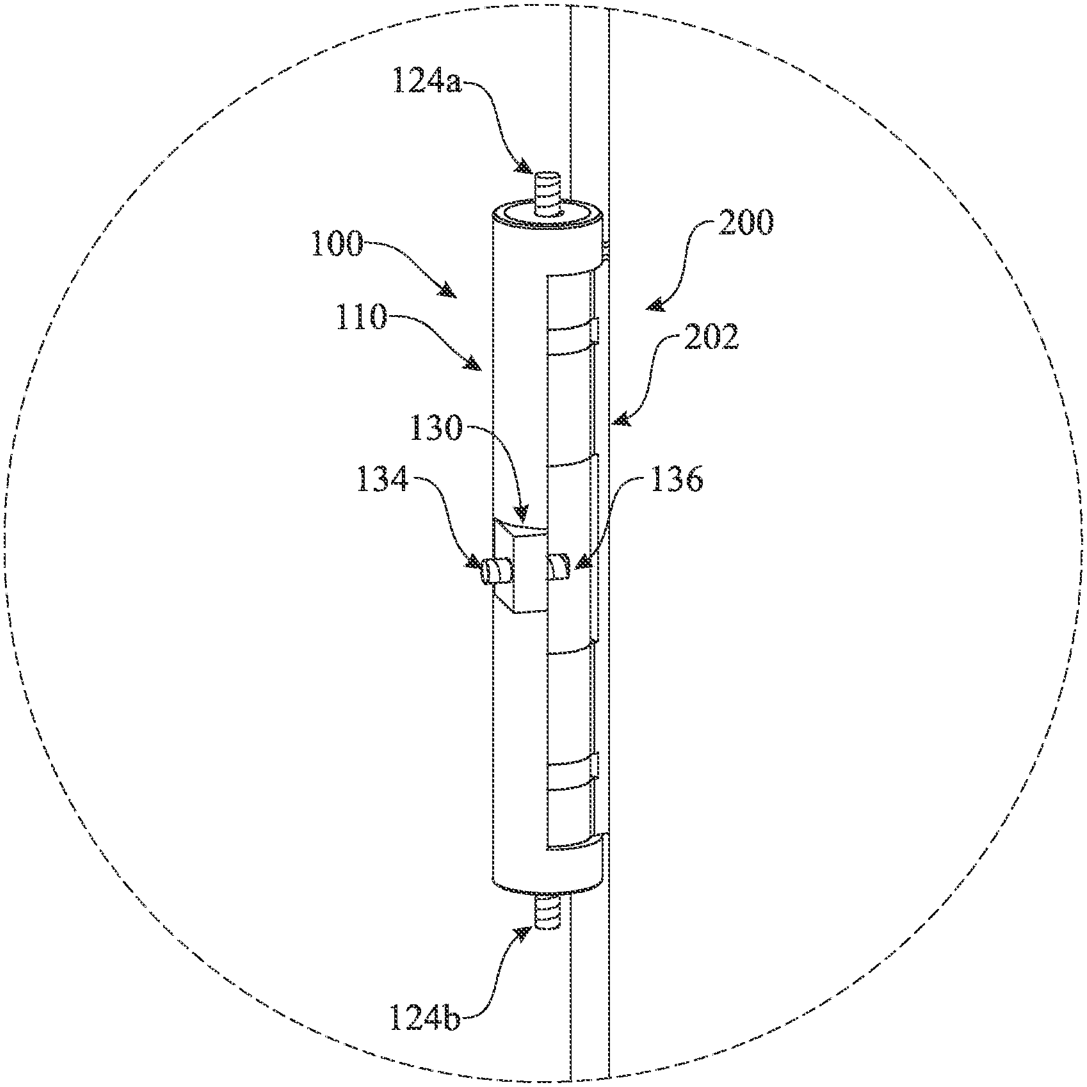
FIG. 6 presents a perspective view showing the door stopper device of the present invention in its fully installed configuration on the door hinge.

Referring now to FIGS. 4-6, with continuing reference to FIGS. 1-3, the installation process begins by mounting the sleeve body 110 to the conventional hinge assembly generally illustrated at 200. The hinge assembly 200 includes a knuckle and pin combination generally illustrated at 202, which includes an upper end 204 (proximal the head of the pin) and a lower end 206 (proximal the tip of the pin). As discussed, the knuckle and pin combination 202 forms the pivot joint of hinge assembly 200. The sleeve body 110 is fit over the pivot joint (knuckle-pin combination) 202 so that the pivot joint 202 is located within the hinge-receiving receptacle space 116 of sleeve body 110; at the same time, the pair of end structures **120*a,b* become axially aligned with the upper and lower ends 204 and 206, respectively, of pivot joint 202. The relationship between mechanism 100 and hinge assembly 200 is adequate to enable the screw-receiving holes 122*a,b* formed respectively in end structure 120*a,b* to align with the head and tip, respectively, of the installed hinge pin. Next, once the hinge-mounting structure 102 is situated in place on hinge assembly 200 (mounting installation of sleeve body 110 and accompanying end structures 120*a,b*), the pair of set screws 124*a,b* are advanced into and through their respective threaded holes 122*a,b* in end structures 120*a,b* (FIGS. 5-6). This continues until the set screws 124*a,b* contact the hinge pin in a press fit engagement that is sufficient to hold mechanism 100 in place on hinge assembly 200 during rotation of the door. As mounted and secured on pivot joint 202 of hinge assembly 200, mechanism 100** remains stationary during door rotation.

In one exemplary embodiment, the door stopper mechanism 100 may include an anti-ligature member 150 that is removably attachable to a set screw **124*a* that is disposable within receiving hole 122*a*. When removably attaching set screw 124*a* to the anti-ligature member 150, an upper portion head, opposite the end portion that goes into hole 122*a*, is inserted into aperture 152 on the anti-ligature member 150. As are the openings 122*a,b* of the sleeve body 110 threaded for threadable engagement with set screes 124*a,b*, the aperture 152 in the anti-ligature member 150 is threaded for threadable engagement with the set screw. The anti-ligature member in one exemplary form may comprise a thin profile body having a trapezoidal shape. Alternative shapes, however, for the anti-ligature member may include rectangular, square, triangular, circular, or any polygon shape. During use of the anti-ligature member 150, the thin body of the member is insertable between the gap 208** formed between the door edge and the hinge jamb.

Figure 7:
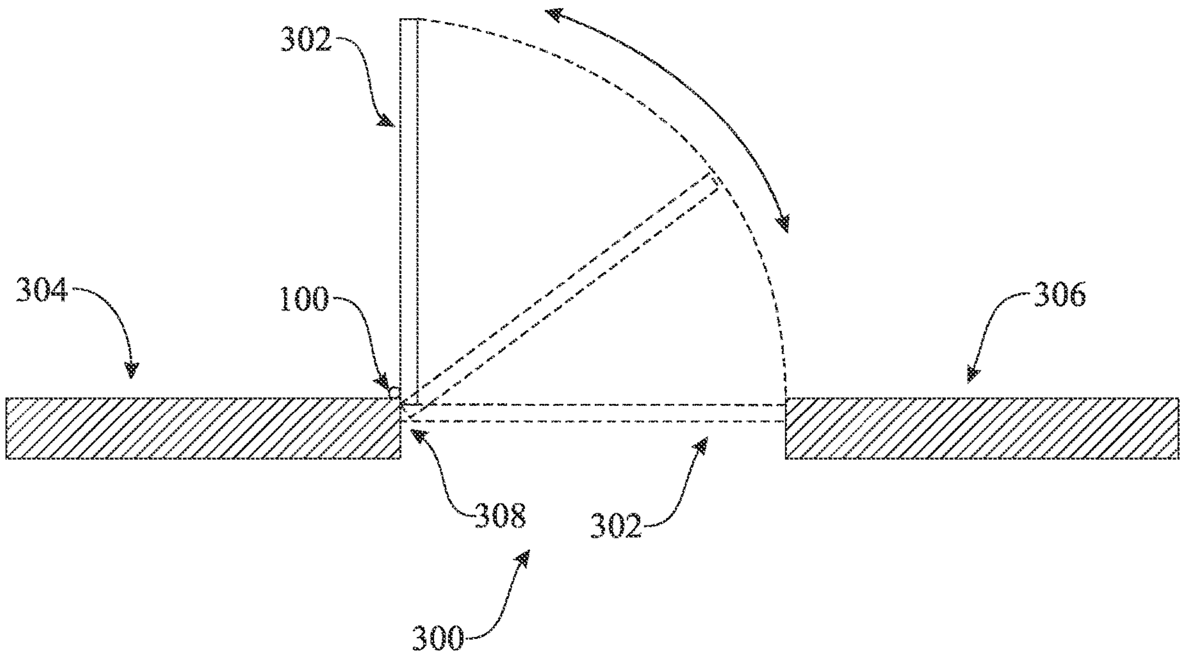
FIG. 7 presents a plan view illustrating how the door stopper device of the present invention provides a range limiting feature to selectively and adjustably control the rotational or pivot range of the door.

Referring now to FIG. 7, a conventional doorway configuration 300 is shown in relationship to door stopper mechanism 100 of the present invention, as installed at the door hinge joint or pivot axis generally illustrated at 308. The doorway 300 conventionally includes a door 302 bordered by a back wall 304 (proximal the door pivot axis 308) and a front wall 306 (distal the door pivot axis 308). The diagram illustratively depicts how mechanism 100 fimctions and/or operates to stop rotation of door 302 at a predetermined angular displacement, in this case a door-opening range of approximately ninety degrees from the closed condition of door 302. The mechanism 100 is configured so that it remains stationary on the mounted hinge assembly during movement of door 302.

The present invention offers several complementary ways to fix or set the range of motion of a door. For example, the hinge-mounting structure 102 of mechanism 100 (specifically the elongate curved sleeve 110) can be mounted to the hinge assembly at different circumferential or peripheral positions of the hinge joint, i.e., the cylindrical formation defined by the knuckle-pin combination. This selectivity involving the placement of hinge-receiving sleeve 110 allows the user to generally specify a smaller or larger range of rotation, which is then fine-tuned by selective adjustment of stop screw 132. For example, the placement of sleeve 110 at circumferential positions on the hinge joint closer to the fixed, frame-side hinge leaf will tend to increase the available range of motion of the door (notwithstanding the position of stop screw 132). Additionally, the range of door rotation can be independently adjusted by changing the degree of advancement or translation of stop screw 132 within its corresponding screw-receiving aperture 138 formed in carrier 130. For example, increasing the extension of stop screw 132 projecting from aperture 138 will correspondingly decrease the range of rotation, while the opposite occurs by shortening the projection of stop screw 132.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A door stopper device for use in combination with a door hinge having a pivot joint, comprising:

A hinge-mounting body having a split sleeve construction defining a hinge-receiving space configured to receive the pivot joint of the door hinge;

a pair of end structures each disposed at respective axial ends of the hinge-mounting body, each end structure including an axially-extending aperture formed therethrough;

a pair of vertically disposed fasteners each operably translatable through the corresponding aperture of a respective end structure to define a connection with the pivot joint of the door hinge; and a carrier that includes a stopper disposed at an exterior surface of the hinge-mounting body, wherein the stopper of the carrier limits rotational movement of the pivot joint of the door hinge.

2. The door stopper device of claim 1, wherein the carrier includes a threaded aperture formed therethrough having a longitudinal dimension generally transverse to the axial dimension of the hinge-mounting body.

3. The door stopper device of claim 2, wherein said stopper comprises a stop screw, and said screw is operably translatable through the aperture formed in the carrier.

4. The door stopper device of claim 3, wherein the stop screw includes a working end head that is configured to strike a portion of the pivot joint of the door hinge.

5. The door stopper of claim 1, wherein a pin is disposable in at least one axial end of the hinge-mounting body, and wherein the pin is securable to a fastener head of the corresponding fastener translating through the corresponding aperture.

6. The door stopper of claim 1, wherein an anti-ligature member is selectively attached to at least one of the vertically disposed fasteners.

7. The door stopper of claim 6, wherein the anti-ligature member includes a thin body profile.

8. The door stopper of claim 6, wherein the anti-ligature member is positionable between a door's hinge edge and a hinge jamb.

9. The door stopper of claim 1, wherein the respective connection between the vertically disposed fasteners and the pivot joint of the door hinge is a press fit connection.

10. The door stopper of claim 1, wherein the pair of end structures encloses the axial ends of the door hinge.

11. The door stopper of claim 1, wherein the door stopper is statically attached to the door hinge and remains in a static position while the pivot joint rotates.

12. The door stopper of claim 1, wherein the carrier is removably attachable to the hinge-mounting body.

13. The door stopper of claim 1, wherein the carrier is integrally formed with the hinge-mounting body.

14. A door stopper device for use in combination with a door hinge, comprising:

an elongate, curved hinge-mounting body having a split sleeve construction defining a hinge-receiving space configured to receive a pivot joint of the door hinge;

a pair of generally circular end structures each disposed at respective axial ends of the hinge-mounting body, each end structure including an axially-extending threaded aperture formed therethrough;

a pair of set screws each operably translatable through the corresponding aperture of a respective end structure to define a respective press fit connection with the pivot joint of the door hinge;

a carrier disposed at an exterior surface of the hinge-mounting body;

wherein the carrier includes a threaded aperture formed therethrough having a longitudinal dimension generally transverse to the axial dimension of the hinge-mounting body; and a stop screw operably translatable through the aperture formed in the carrier, wherein the stop screw of the carrier limits rotational movement of the pivot joint of the door hinge.

15. The door stopper of claim 14, wherein a pin is disposable in at least one axial end of the hinge-mounting body, and wherein the pin is securable to a set screw head of the corresponding set screw translating through the corresponding aperture.

16. The door stopper of claim 14, wherein an anti-ligature member is selectively attached to at least one of the set screws.

17. The door stopper of claim 16, wherein the anti-ligature member includes a thin body profile and a trapezoidal shape.

18. The door stopper of claim 14, wherein the door stopper is statically attached to the door hinge and remains in a static position while the pivot joint rotates within the hinge-receiving space.

19. The door stopper of claim 14, wherein the pair of end structures encloses the axial ends of the door hinge.

20. A door stopper device for use in combination with a door hinge, comprising:

an elongate, curved hinge-mounting body having a split sleeve construction defining a hinge-receiving space configured to receive a pivot joint of the door hinge;

a pair of generally circular end structures each disposed at respective axial ends of the hinge-mounting body, each end structure including an axially-extending threaded aperture formed therethrough, wherein the pair of end structures encloses the axial ends of the door hinge;

a pair of set screws each operably translatable through the corresponding aperture of a respective end structure to define a respective press fit connection with the pivot joint of the door hinge;

an anti-ligature member threadably attachable to at least one of the pair of set screws;

a pin disposable within the axially-extending threaded aperture of at least one of said end structures, wherein the pin is securable to a set screw head of the corresponding set screw translating through the corresponding aperture;

a carrier disposed at an exterior surface of the hinge-mounting body;

wherein the carrier includes a threaded aperture formed therethrough having a longitudinal dimension generally transverse to the axial dimension of the hinge-mounting body; and a stop screw operably translatable through the aperture formed in the carrier, wherein the stop screw of the carrier limits rotational movement of the pivot joint of the door hinge.

* * * * *